June 18, 1929.   J. E. BELL   1,717,830
PULVERIZED FUEL BURNING APPARATUS
Filed May 5, 1922   6 Sheets-Sheet 1

Inventor
John E. Bell
By Attorneys

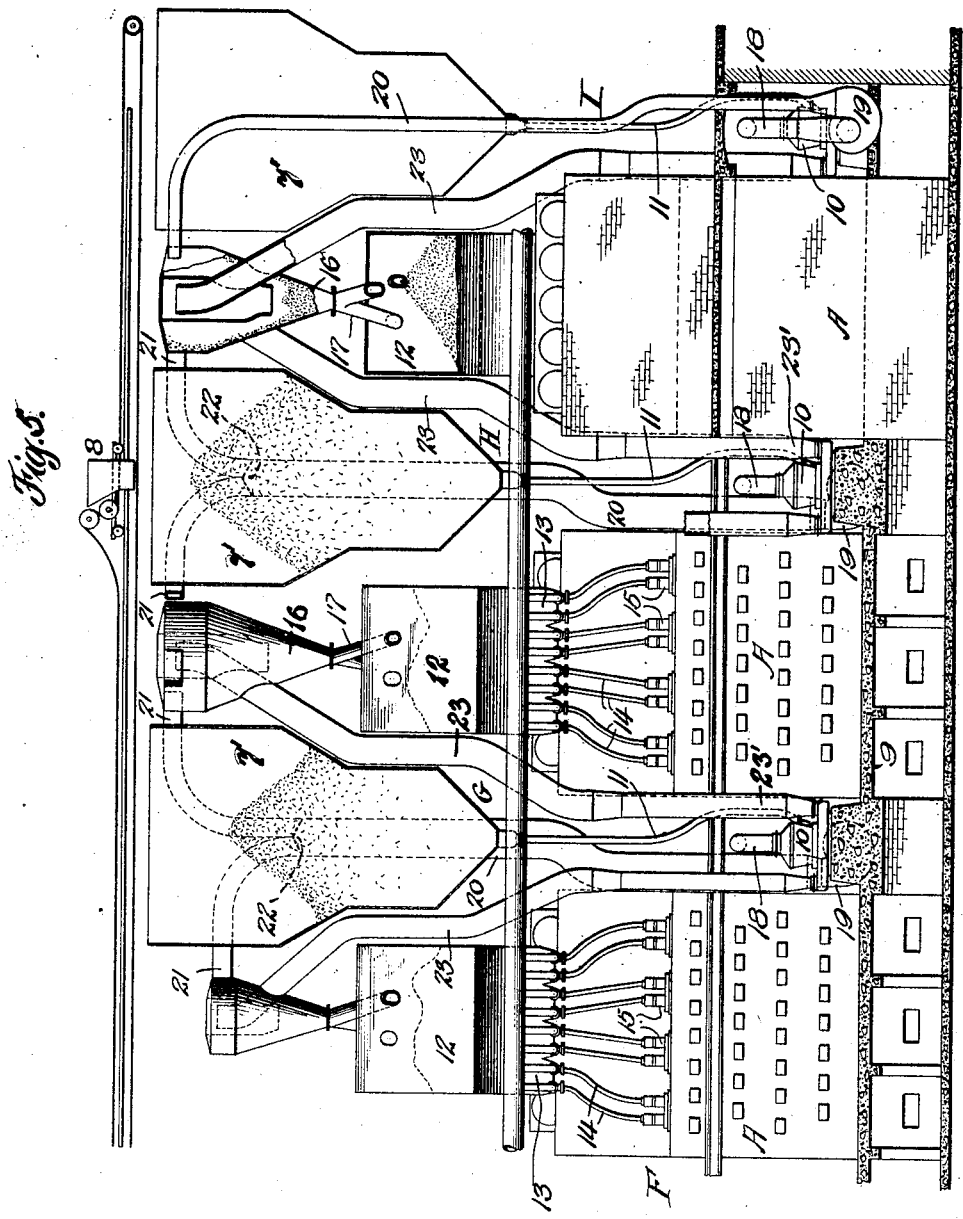

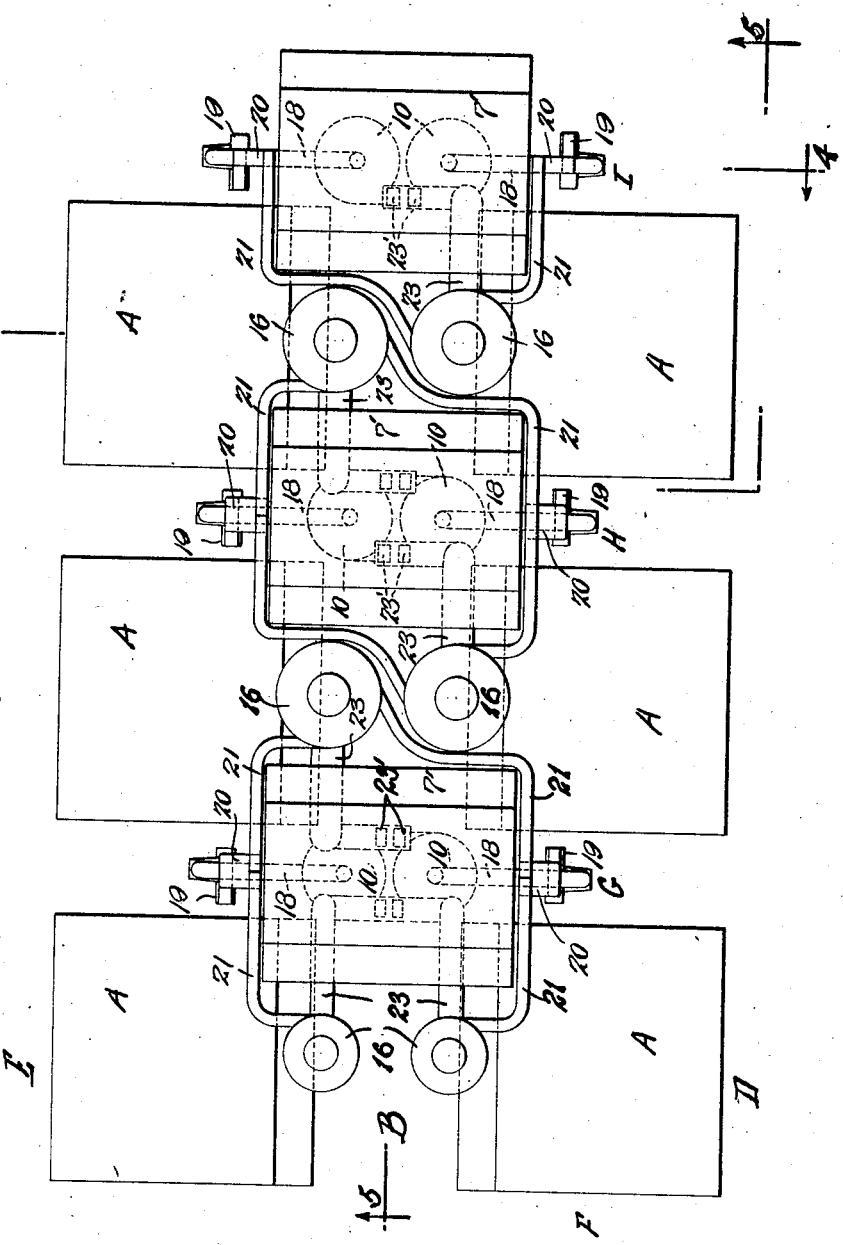

Patented June 18, 1929.

1,717,830

UNITED STATES PATENT OFFICE.

JOHN E. BELL, OF BROOKLYN, NEW YORK, ASSIGNOR TO COMBUSTION ENGINEERING CORPORATION, A CORPORATION OF NEW YORK.

PULVERIZED-FUEL-BURNING APPARATUS.

Application filed May 5, 1922. Serial No. 558,702.

This invention relates to pulverized fuel burning apparatus and it has for one of its primary objects the provision of improved means whereby maximum flexibility is obtained in the apparatus for supplying the boiler combustion chamber with fuel, whereby necessity of shutting down one or more boilers in case of failures is eliminated. Stated in another way, it is one of the objects of my invention to provide for maximum operating efficiency so that losses incident to enforced shut down may be practically eliminated.

Still another object of the invention has to do with a simple and compact arrangement of mechanism by virtue of which the size of the boiler house may be cut down while at the same time all parts are readily accessible.

Figure 1:
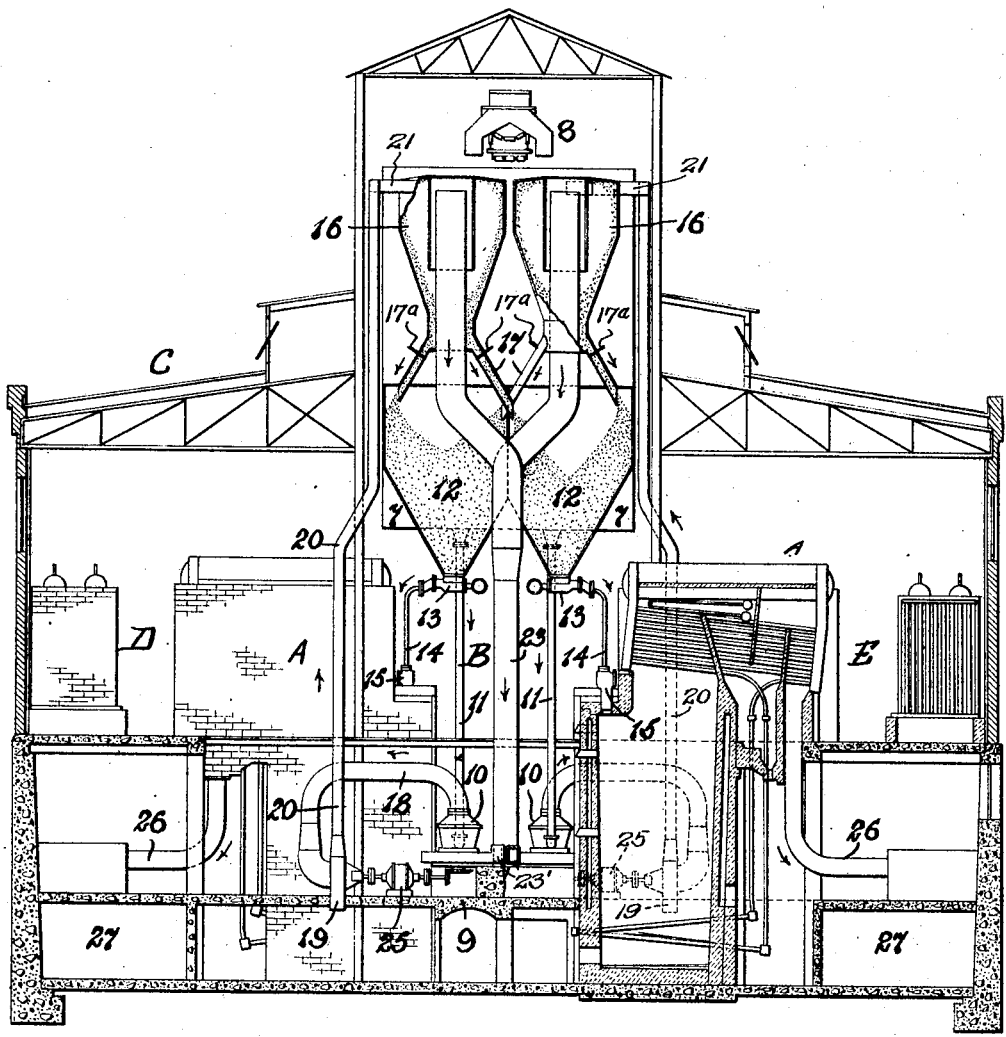
Figure 2:
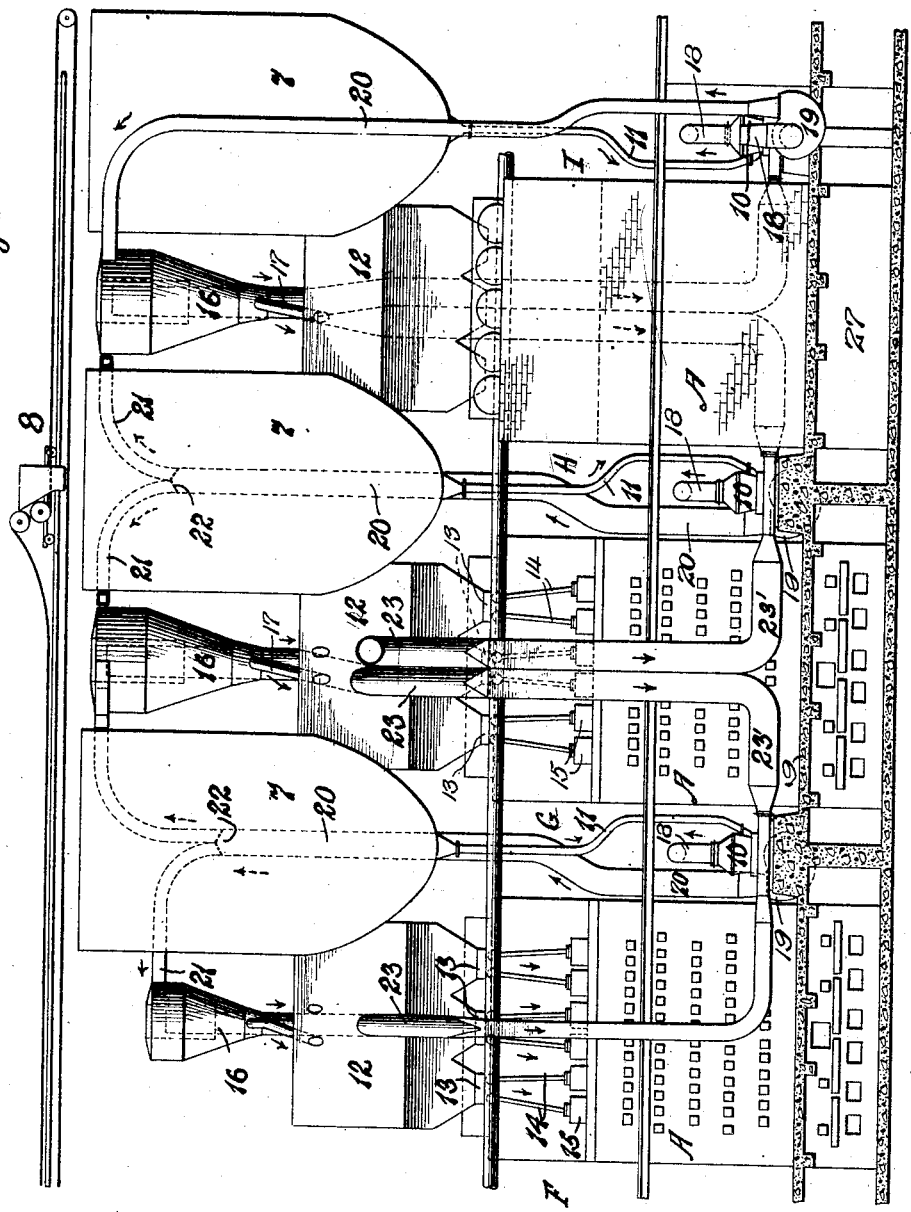
Figure 3:
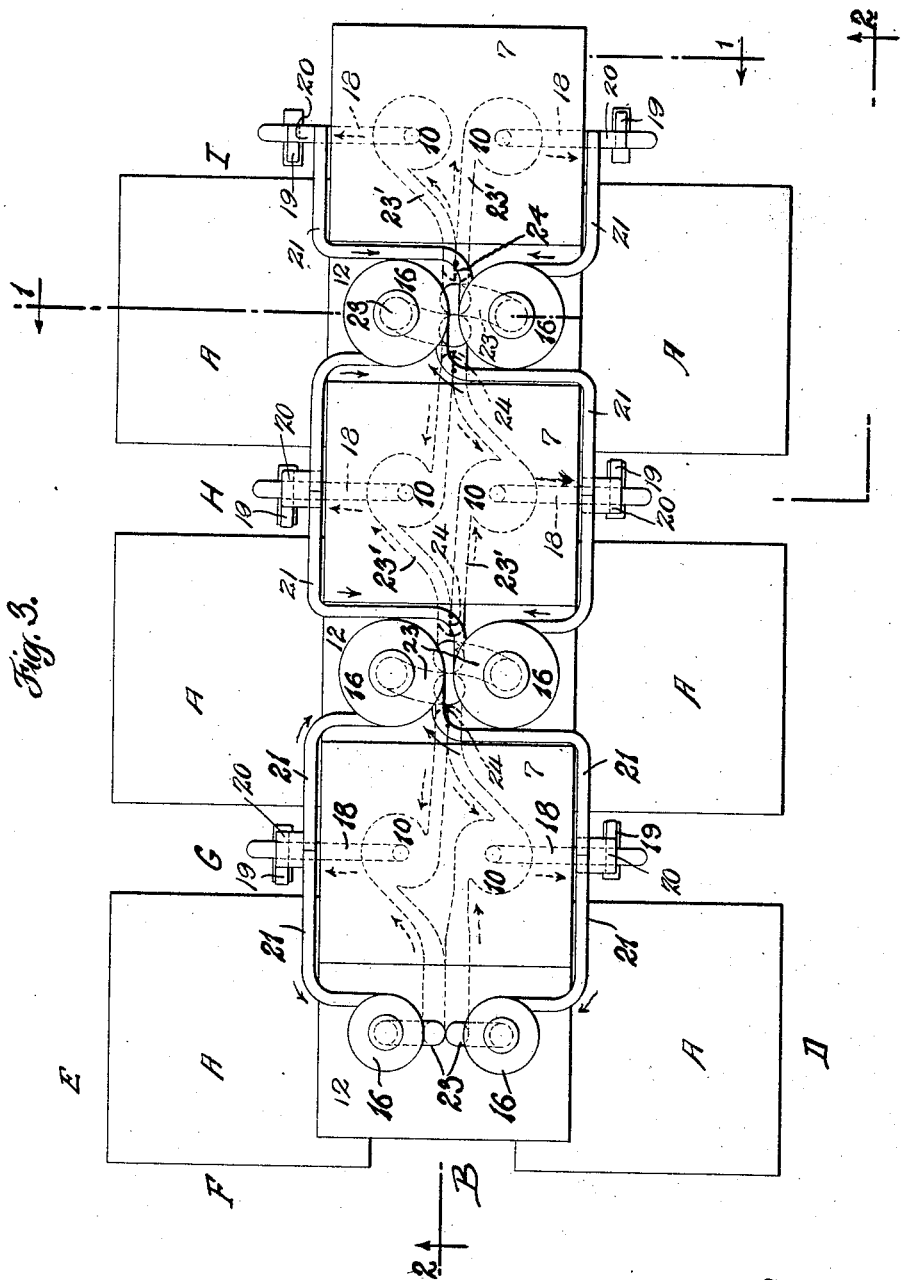
Figure 4:
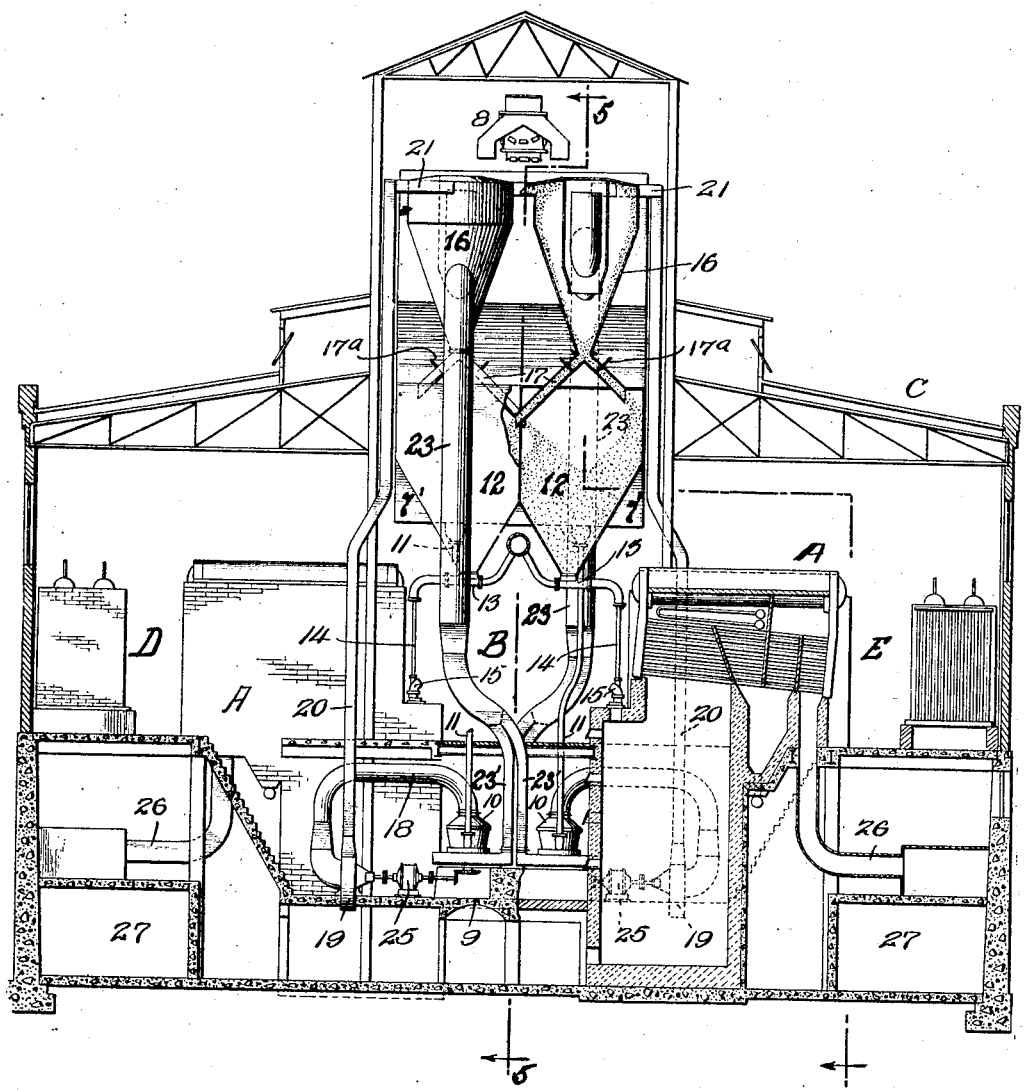

The foregoing, together with such other objects as may hereinafter appear or are incident to my invention, I obtain by means of a construction which I have illustrated in preferred form in the accompanying drawings, wherein:

Fig. 1 is a cross section through a boiler house embodying my improvements, the same being taken on the line 1—1 of Fig. 3; Fig. 2 is a section taken on the line 2—2 of Fig. 3; Fig. 3 is a plan view of the boilers and the means for supplying fuel thereto; Fig. 4 is a sectional view corresponding to Fig. 1, but illustrating a modification of my invention; Fig. 5 is a section taken on the line 5—5 of Fig. 4; and Fig. 6 is a top plan view of the boilers and the means for supplying the same with fuel.

Referring now to Figs. 1 to 3, inclusive, it will be seen that the boilers A, of which there are six shown, are arranged in opposing rows, front to front, and spaced apart to provide a longitudinal aisle or bay B, the two rows of boilers dividing the boiler house, indicated as a whole by the reference letter C, into three longitudinal aisles, namely the aisle B, hereinbefore mentioned, and the aisles D and E. The boilers of each row are also spaced apart so as to provide cross or intersecting aisles F, G, H and I.

For each boiler, I provide a coal bin 7 to which the coal, which is preferably crushed or in other suitable form, is supplied by means of an overhead longitudinally extending conveyor mechanism 8. The six crushed coal bins 7 are arranged in pairs, each pair being located in an upper part of the longitudinal bay B, substantially above the points of intersection of such aisle and the cross aisles. Located beneath each paid of bins 7 and on the floor 9, are pairs of pulverizers 10, one for each boiler, preferably located above the boiler house floor. Coal is discharged from each of the bins 7 to the corresponding pulverizers, substantially vertically downward, by means of the pipes 11.

Located over the aisle B and approximately in line with the pairs of opposing boilers, are pairs of pulverized coal bins 12. The pulverized coal bins are thus located approximately intermediate the crushed coal bins 7, which latter have their bottom portions cut away, as indicated in Fig. 2, so as to obtain maximum size of pulverized coal bins. Each bin 12 is provided with feeder mechanisms 13 and pipes 14 carry the fuel from the respective feeders to the burners 15 of the boilers.

A separator 16 for separating the pulverized coal from the air which carries it through the piping, is provided for each boiler and these separators are located in pairs above the bins 12 and between or at the sides of the crushed coal bins 7. Each separator is provided with two gate valve controlled discharge spouts 17, each adapted to serve one bin. The gates are indicated at 17ª. One separator is thus capable of supplying two bins in case the companion separator should go out of commission.

Pulverized coal is delivered from each pulverizer to the separators by means of the pipe 18, blower 19 and pipe 20, which latter, at the top forks into two branches 21, each of which leads to a separator. The branches are controlled by a damper or valve mechanism 22, shown in Fig. 2, so that one pulverizer may supply either or both of two separators. Normally, each pulverizer will supply one separator but in case an adjacent pulverizer should go out of commission, its separator may be supplied by proper manipulation of the valve mechanism 22. Referring now particularly to Fig. 3, it will be seen that the right-hand pair of pulverizers are connected to discharge into one separator; each of the next pair of pulverizers is connected to discharge into two separators, (one of each of the two pairs of adjacent separators); one pulverizer normally supplying one separator and the other pulverizer, the remaining separator; and the two pulverizers at the left-hand end are connected to the remaining three separators, one of the separators being connected in common to the two pulverizers. Having in mind that each separator is adapted to feed two bins, it will be seen that any one of the pulverizers of the middle and left-hand pairs can supply four bins, while either of the pulverizers of the right-hand pair can supply two bins.

A return pipe 23 leads from each separator to a pulverizer, to conduct the carrying air back to the pulverizer after the coal has been separated out. The return pipe leading to the right-hand pair of pulverizers shown in Fig. 3 forks at the bottom into two branches 23', the fork being damper controlled, as indicated at 24, so that when one pulverizer is shut down the return thereto may be cut off. The return pipes 23 leading to the middle pair of pulverizers are similarly forked and damper controlled; and the return pipe leading from the separator connected in common with two pulverizers at the left-hand end is also so forked.

From inspection of Figs. 1 and 3 it will be seen that the return pipes extend downward from the separators through the aisle B to the pulverizers; and that the pipes 18 extend into cross aisles in which the blowers 19 are also located and from which the feed pipes 20 lead upwardly to the separators. It will further be noted that a single motor 25 serves to operate one pulverizer and one blower 19, such boiler being located in the cross aisle intermediate the respective pulverizer and blower.

The products of combustion are drawn off from the respective furnaces or combustion chambers of the boilers by the outlets 26 leading to the flues 27 located in a tunnel below the aisles D and E. These flues lead to a stack, not shown.

Referring now to Figs. 4, 5 and 6, substantially the same general arrangement is provided as in the construction of Figs. 1, 2 and 3. In the construction of the latter figures, however, the return pipes 23 pass directly downward through the separators and then laterally inward through the bins 12 and then down through the aisle B immediately between the opposing fronts of the pairs of boilers. In the construction of Figs. 4, 5 and 6, the return pipes are led out the sides of the separators so as to clear the fronts of the opposing boilers, the crushed coal bins 7' being so shaped as to provide a space between such bins and the pulverized coal bins, through which the return pipes may be led.

I claim:

1. In pulverized fuel burning apparatus, four combustion chambers, a pulverized fuel bin for each chamber for supplying fuel thereto, a separator for each bin for supplying fuel thereto, each separator being adapted also to supply fuel to a second of the bins, and a pair of pulverizers each connected to discharge fuel into two separators.

2. In pulverized fuel burning apparatus, four combustion chambers, a pulverized fuel bin for each chamber for supplying fuel thereto, a separator for each bin for supplying fuel thereto, each separator being adapted also to supply fuel to a second of the bins, and a pair of pulverizers each connected to discharge fuel into two separators, one of which separators is connected to receive fuel from both pulverizers.

3. In pulverized fuel burning apparatus, a plurality of combustion chambers, at least three separators, at least two pulverizers and a delivery connection for pulverized fuel from each pulverizer to two separators, one of which separators is connected to receive fuel from both pulverizers, together with means whereby fuel from the separators may be fed to the combustion chambers.

4. In pulverized fuel burning apparatus, a plurality of combustion chambers, at least three separators, at least two pulverizers and a forked delivery connection for pulverized fuel from each pulverizer leading to two separators, and valve mechanism controlling the forks, one of the separators being connected to receive fuel from both pulverizers, together with means whereby fuel from the separators may be fed to the combustion chambers.

5. In pulverized fuel burning apparatus, a plurality of combustion chambers, four pulverized coal bins, at least three separators, each of which is connected to discharge fuel into two of the bins, valve mechanism for controlling which of the bins shall be served, and a pair of pulverizers, each connected to discharge the pulverized coal into two of the separators, one of which separators is connected to receive fuel from both pulverizers, together with means whereby fuel may be fed from the bins to the combustion chambers.

6. In pulverized fuel burning apparatus, a plurality of combustion chambers, four pulverized coal bins, at least three separators, each of which is connected to discharge fuel into two of the bins, valve mechanism for controlling which of the bins shall be served, and a pair of pulverizers, each connected to discharge the pulverized coal into two of the separators, one of which separators is connected to receive fuel from both pulverizers, and an air return conduit leading from the separators to the pulverizers, the return conduit from the separator which is connected to receive coal from both pulverizers being common to both pulverizers, together with means whereby fuel may be fed from the bins to the combustion chambers.

In testimony whereof, I have hereunto signed my name.

JOHN E. BELL.